(12) United States Patent
Ramachandran et al.

(10) Patent No.: US 10,075,342 B2
(45) Date of Patent: Sep. 11, 2018

(54) ACTION ORCHESTRATION IN FAULT DOMAINS

(71) Applicant: Microsoft Technology Licensing, LLC, Redmond, WA (US)

(72) Inventors: Varun Ramachandran, Redmond, WA (US); Brad D. Rutkowski, Woodinville, WA (US); Mathru Janakiraman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 536 days.

(21) Appl. No.: 14/738,572

(22) Filed: Jun. 12, 2015

(65) Prior Publication Data

US 2016/0366020 A1    Dec. 15, 2016

(51) Int. Cl.
*G06F 15/16*    (2006.01)
*H04L 12/24*    (2006.01)
*G06Q 10/06*    (2012.01)

(52) U.S. Cl.
CPC ..... *H04L 41/0893* (2013.01); *G06Q 10/0631* (2013.01); *H04L 41/12* (2013.01); *H04L 41/142* (2013.01); *H04L 41/22* (2013.01)

(58) Field of Classification Search
CPC .. H04L 41/0893; H04L 41/12; G06Q 10/0631
See application file for complete search history.

(56) References Cited

U.S. PATENT DOCUMENTS

| | | | |
|---|---|---|---|
| 7,979,551 B2 | 7/2011 | Ingle et al. | |
| 7,996,719 B2 | 8/2011 | Bernabeu-Auban et al. | |
| 8,010,565 B2 * | 8/2011 | Gujarathi | G06Q 10/087 707/791 |
| 8,878,852 B1 | 11/2014 | Klein et al. | |
| 8,984,121 B1 * | 3/2015 | Labat | G06F 8/70 707/769 |
| 2011/0321031 A1 | 12/2011 | Dournov et al. | |

(Continued)

OTHER PUBLICATIONS

"International Search Report and Written Opinion Issued in PCT Application No. PCT/US2016/035950", dated Aug. 5, 2016, 12 Pages.

(Continued)

*Primary Examiner* — Bryan Lee
(74) *Attorney, Agent, or Firm* — Scott Y. Shigeta; Newport IP, LLC

(57) ABSTRACT

Concepts and technologies are described herein for providing an automated mechanism for grouping devices to allow safe and scalable actions to be taken in parallel. A computing device obtains data that defines service relationships between computing entities in a network of computing entities controlled by a service provider. The computing device determines two or more groups of computing entities having one of a direct or indirect relationship with other computing entities within one of the two or more groups based on the obtained data. Then, the computing device determines one or more subgroups of one of the two or more groups based on the obtained data. Individual computing entities within a first subgroup of the one or more subgroups do not have a direct relationship with any of the other computing entities with the first subgroup. Output data identifying at least a portion of the subgroups is generated.

20 Claims, 6 Drawing Sheets

(56) References Cited

U.S. PATENT DOCUMENTS

| | | |
|---|---|---|
| 2013/0114465 A1 | 5/2013 | McGovern |
| 2013/0204990 A1 | 8/2013 | Skjolsvold et al. |
| 2013/0282765 A1* | 10/2013 | Bhattacharjee ... G06F 17/30292 |
| | | 707/803 |
| 2013/0326038 A1 | 12/2013 | Bodik et al. |
| 2014/0156847 A1 | 6/2014 | Moscibroda et al. |
| 2015/0100826 A1 | 4/2015 | Vujic et al. |

OTHER PUBLICATIONS

Zhai, et al., "Auditing the Structural Reliability of the Clouds", In Technical Report YALEU/DCS/TR-1479, Jul. 2013, 28 pages.

Zhai, et al., "Heading off Correlated Failures through Independence-as-a-Service", In Proceedings of the 11th USENIX Symposium on Operating Systems Design and Implementation, Oct. 6, 2014, 35 pages.

Epping, Duncan, "One Versus Multiple VSAN Disk Groups per Host", Published on: May 22, 2014, Available at: http://www.yellow-bricks.com/2014/05/22/one-versus-multiple-vsan-diskgroups-per-host/.

Seget, Vladan, "How to Configure VMware High Availability (HA) Cluster", Published on: Jan. 18, 2013, Available at: http://www.vladan.fr/how-to-configure-vmware-high-availability-ha-cluster/.

Denneman, Frank, "Configuring PernixData FVP 2.0 Fault Domains", Published on: Oct. 1, 2014, Available at: http://frankdenneman.nl/2014/10/01/configuring-pernixdata-fvp-2-0-fault-domains/.

* cited by examiner

ACTION ORCHESTRATION IN FAULT DOMAINS

BACKGROUND

Currently, when making large-impact changes in a data center or any multi-computer system, such as infrastructure maintenance, are scheduled manually. Such systems may be operating many racks of computing entities (i.e., computing entities) in many fault domains. When taking computing entities offline to perform large-impact changes or for routine maintenance, many hours may be needed for completing the changes/maintenance without affecting data and service operations. Manual selection of devices for servicing fails to account for interrelated complexities in the fault domains.

A simple way of achieving minimal capacity disruption would be to work on only one rack at a time. However, at this rate, any maintenance covering all the racks in a 3,500-rack infrastructure can take months to complete. This approach is highly inefficient and even impractical for use with some large systems.

It is with respect to these and other considerations that the disclosure made herein is presented.

SUMMARY

Concepts and technologies are described herein for providing an automated mechanism that understands complex service relationships between computing entities within a multi-computer system and creates groupings of the computing entities based on those service relationships to allow safe and scalable actions to be taken in parallel.

An example computing device that provides the automated mechanism includes a processor and a memory having computer-executable instructions stored thereupon. The computer-executable instructions, when executed by the processor, cause the computing device to obtain data that defines service relationships between computing entities in a network of computing entities controlled by a service provider. The network of computing entities are then separated into two or more groups of computing entities based at least on the service relationship data, wherein each computing entity in a first group has no service relationship with any computing entity in a second group. Next, the first group is separated into subgroups of computing entities based at least on the service relationship data, individual computing entities within a first one of the subgroups of computing entities do not have a direct relationship with any of the other computing entities with the first subgroup. Configurations disclosed herein may generate data identifying at least a portion of one or more of the subgroups of computing entities.

It should be appreciated that the above-described subject matter may also be implemented as a computer-controlled apparatus, a computer process, a computing system, or as an article of manufacture, such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The detailed description is described with reference to the accompanying figures. In the figures, the leftmost digit of a reference number identifies the figure in which the reference number first appears. The same reference numbers in different figures indicate similar or identical items.

DETAILED DESCRIPTION

Figure 1:
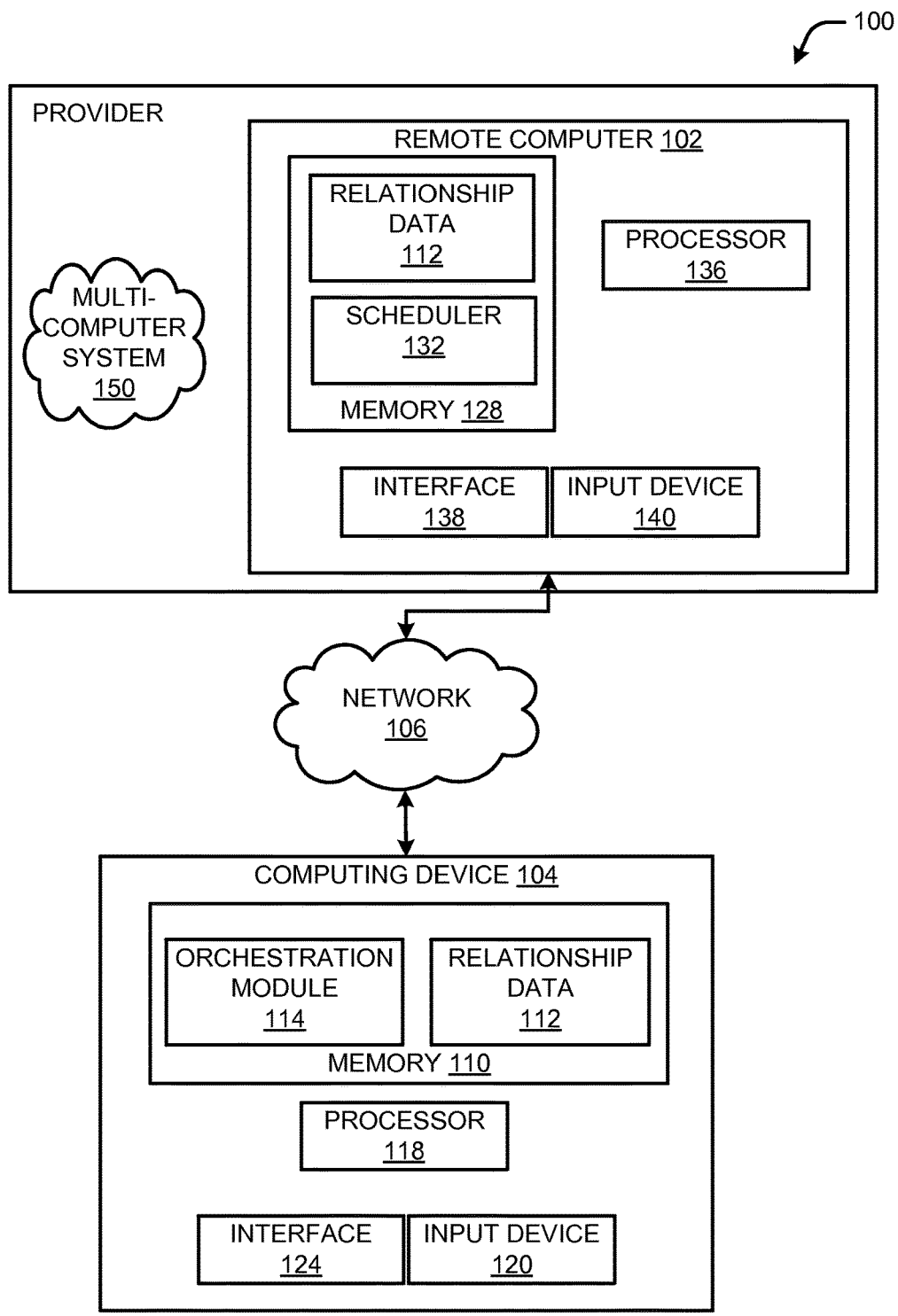
FIG. 1 is a block diagram showing example components for providing automated action orchestration for computing entities of a multi-computer infrastructure.

Concepts and technologies are described herein for an automated mechanism that analyzes complex service relationships within a service hosted by a multi-computer infrastructure to create subgroups of computing entities that will allow safe and scalable actions to be performed in parallel. The created subgroups ensure that, even if any subgroup of computing entities is removed from service, the multi-computer infrastructure will still have enough capacity to maintain uninterrupted service to customers. The created sub groups when separately scheduled for service maintain an acceptable speed of orchestration of any upgrades and/or scheduled maintenance. A simple way of achieving minimal capacity disruption would be to work on only one computing entities at a time. For illustrative purposes, a computing entity can include a computer, a rack of computers or other arrangement of devices working in a coordinated fashion. At this rate, changing/upgrading computing entities of a large multi-computer infrastructure, e.g., a system with many thousands of server racks, would take many months to complete. This is highly inefficient and unnecessarily cautious. Alternatively, one could service all server racks in parallel, but this could produce catastrophic service results.

The techniques disclosed herein may generate data indicating an order in which the computing entities can be removed from service. As will be described in more detail below, the generated data allows for a coordinated removal of computing entities from service such that capacity in a fault domain is optimized while parallelizing downtime of as many racks as possible.

In some configurations, service relationships between computing entities are determined. These service relationships, for example, may be defined by a multi-computer operator (e.g., Azure™ provided by Microsoft Corporation of Redmond, Wash.). A service relationship graph is built, based on the determined service relationships. Computing entities may be directly related in multiple ways. For example, consider a scenario where a first computing entity and a second computing entity both support a mailbox service for customers and the second computing entity stores a mirror copy of the mailbox for the first computing entity. This example scenario shows a direct relationship between the first computing entity and the second computing entity. If the first and second computing entities were both removed for service at the same time, the mailbox service would be impacted. Due to physical rack designs, multiple types of computing entities may be linked to each other. To account for this, all the service relationships in a computing entity are considered the computing entity's fault domain. Other examples of services provided by multiple computing entities include mirrored authentication services and load balancing functions.

As summarized above, a network of computing entities are first separated into two or more groups of computing entities based at least on the service relationship data, wherein each computing entity in a first group has no service relationship with any computing entity in a second group.

For illustrative purposes, consider the following scenario involving three computing entities: computing entity A, computing entity B, computing entity C, computing entity D, and computing entity E. Computing entity A mirrors an email service for computing entity B. In addition, computing entity A mirrors an email service for computing entity C. However, computing entity B and computing entity C do not mirror each other. In this example, computing entity D is a website server that is independent of the email service, and computing entity E is mirrors computing entity D.

In applying techniques disclosed herein to this example, the system may generate data defining two groups of computing entities. Specifically, techniques disclosed herein may determine that computing entity A, computing entity B, and computing entity C are associated with a first group. In addition, techniques disclosed herein may determine that computing entity D and computing entity E are associated with a second group. In this example, the computing entities of the first group have no service relationship with any computing entity in the second group.

As also summarized above, the system determines subgroups of the individual groups. The subgroups of computing entities are determined based at least on the service relationship data. In some configurations, the subgroups are defined such that individual computing entities within a subgroup of computing entities do not have a direct relationship with any of the other computing entities within the same subgroup. In addition, computing entities in the same subgroup may have an indirect relationship with each other.

In applying techniques disclosed herein to the above-described example, the system may generate data defining two subgroups from the individual groups. Specifically, techniques disclosed herein may determine that computing entity B and computing entity C are associated with a first subgroup. Computing entity B and computing entity C have an indirect relationship with each other and they do not have a direct relationship with each other, thus they may be associated with the first subgroup. In this example, computing entity A would be in a second subgroup. As can be appreciated, computing entity B and computing entity C may be simultaneously removed from service without affecting their respective email services because computing entity A may provide the service for both computing entities. Similarly, when computing entity A is taken down for service, computing entity B and computing entity C may provide their respective services. The second group, for example, would include two subgroups, each having computing entity D and computing entity E given that they have a direct relationship. As will be described in more detail below, in some configurations, these techniques may increase the performance of system maintenance and/or conversion and reduce any risk of lost service.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which show, by way of illustration, specific embodiments or examples. Referring now to the drawings, in which like numerals represent like elements throughout the several figures, aspects of a computing system and methodology for providing action orchestration for computing entities in complex fault domains will be described.

FIG. 1 is a system diagram showing aspects of one illustrative mechanism disclosed herein for providing action orchestration for a system having complex fault domains, such as a multi-computer system. As shown in FIG. 1, a system 100 may include a remote computer 102 associated with a multi-computer system 150, a computing device 104 and a network 106. The computing device 104 may operate as a stand-alone device, or the computing device 104 may operate in conjunction with the remote computer 102. As can be appreciated, the remote computer 102 and the computing device 104 are interconnected through one or more local and/or wide area networks, such as the network 106. It should be appreciated that many more network connections may be utilized than are illustrated in FIG. 1. The remote computer 102 and the computing device 104 may share data via removable hardware devices, thus not having need for a network connection.

The computing device 104 may be in the form of a personal computer or any other device having components for causing a display of data on a display, such as an interface 124. The computing device 104 may include local memory 110. Local memory 110 may store service relationship data received from the remote computer 102 via a processor 118, or from manual entry via an input device 120 and an interface device 124.

The memory 110 may also include an orchestration module 114 configured to manage techniques described herein. The orchestration module 114 may be in the form of an operating system component or any other application. The orchestration module 114 may generate an orchestration schedule for use by a multi-computer operations controller that is associated with the remote computer 102 and the associated multi-computer system 150 (see example in FIG. 2).

By the use of at least one input device 120, such as an input/output device, microphone, keyboard, or any other device, service relationship data 112 associated with the multi-computer system 150 can be obtained by manual entry or retrieved from the remote computer 102.

The remote computer 102 may be similar to the computing device 104. The remote computer 102 may be configured to store in memory 128 the service relationship data 112. The service relationship data 112 identifies service relationships between computing entities of the associated multi-computer system 150. The service relationship data 112 may be user-defined service relationships, i.e., those defined by the provider associated with the multi-computer system 150.

The memory 128 may also include a scheduler module 132 that, when executed by a processor 136, generates a maintenance schedule based on identified subgroups of computing entities. The memory 128 may also include components, such as the orchestration module 114, for performing service orchestration. The remote computer 102 may also include an interface device 138, similar to that in the computing device 104, to present the maintenance schedule and/or a service orchestration schedule. An input device 140, similar to that in the computing device 104, allows a user of the remote computer 102 to manually enter the service relationship data 112 for the multi-computer system 150. The user of the remote computer 102 may retrieve the service relationship data 112 from the multi-computer system 150.

Figure 2:
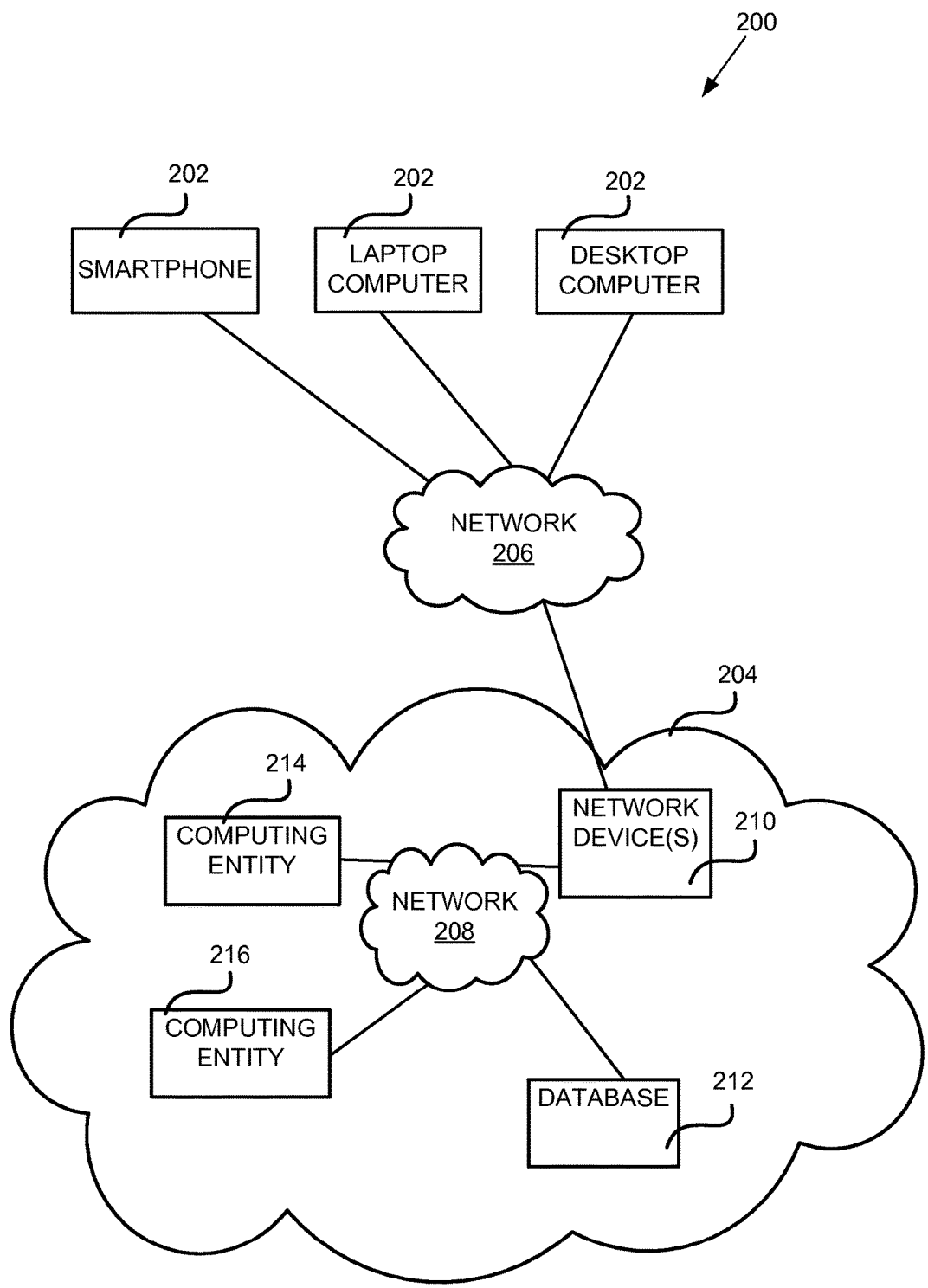
FIG. 2 illustrates an example of a multi-computer computing environment.

Referring now to FIG. 2, aspects of an illustrative example of a multi-computer system 200, such as the multi-computer system 150 shown in FIG. 1, are shown and described. The multi-computer system 200 may include a plurality of user devices 202 that communicate via a network 206 (e.g., a public and/or a private data network), with a multi-computer infrastructure 204.

The multi-computer infrastructure 204 includes a network 208, which may include various network devices 210, such as routers, bridges, gateways, links, and other devices that cooperate to provide network connectivity. Computing entities 214, 216 use the network 208 to communicate with each other, with hosts outside the multi-computer infrastructure 204 via the network device 210, and with database 212 within the multi-computer infrastructure 204. The computing entities 214, 216 may include blade computers, computers in a rack, workstations, laptops, or any other computer generally having a processor, memory, and an interface for communicating with the network 208.

Each computing entity 214, 216 may have execution units executing thereon. An execution unit may be a process, a virtual machine, an application, or service, etc. As execution units may communicate with each other across the network 208. The term "flow" or "path" is sometimes used to refer to a connection between two specific execution units or, specifically, a traffic stream from a sending execution unit to a receiving execution unit. For example, a database server execution unit on one computing entity 214 may have a flow of communication with a network service execution unit on another server 216. The service relationship data 112 identifies these flows between computing entities.

Although not shown, the multi-computer infrastructure 204 may, in some cases, include software infrastructure to manage the multi-computer infrastructure 204. The software infrastructure may perform functions such as load balancing; migration of virtual machines; abstraction of services, such as data storage; access control; allocating resources, such as processor time; power management, and so on. The service relationship data 112 may include the software infrastructure.

An orchestration for servicing many computing entities may include multiple scopes. Each scope identifies a definite set of computing entities to target (e.g., regional). Scopes may be identified by the provider (e.g., multi-computer administrator) or by an administrator of the computing device 104. Typically, scopes start out small and grow to eventually cover all computing entities. This allows slice-in-production/test (SIP/T) changes and avoids widespread damage due to bad workflows and/or service orchestration. Within each scope, the computing entities are broken down into groups, wherein each group is a connected component in the service relationship graph of all computing entities in the scope—see FIGS. 3A-B.

Figure 4A:
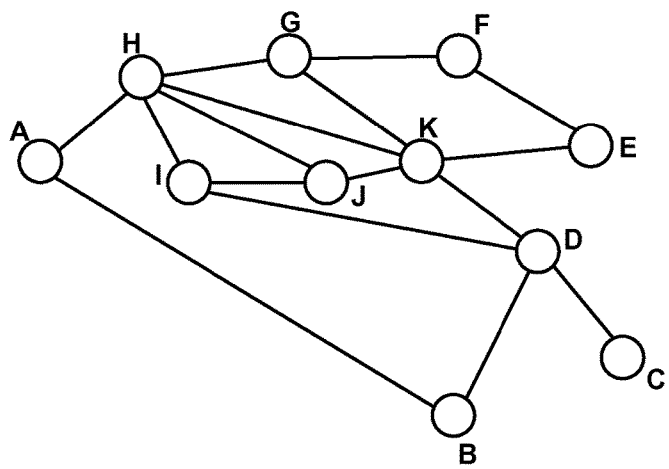
FIGS. 4A-4C illustrate an example of several subgroups within a group of computing entities.
Figure 4B:
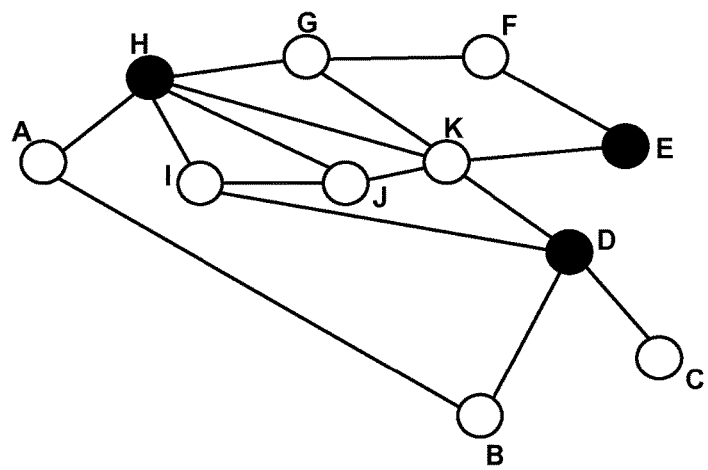
Figure 4C:
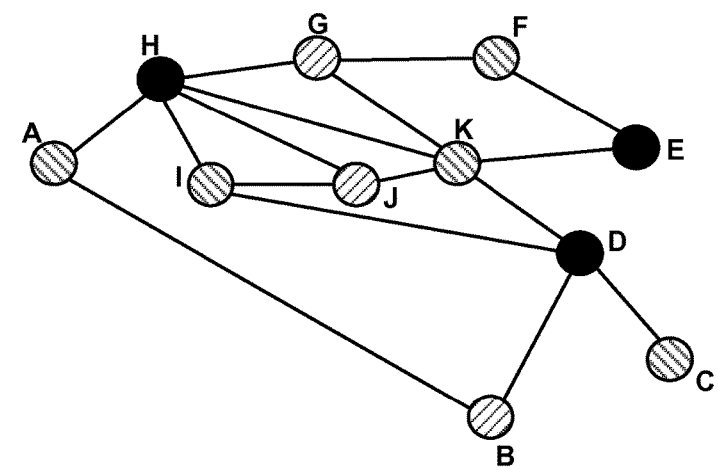

In each group, computing entities are further separated into subgroups—see FIGS. 4A-C. The computing entities of a subgroup are removable from service at the same time, without affecting multi-computer services.

Figure 3A:
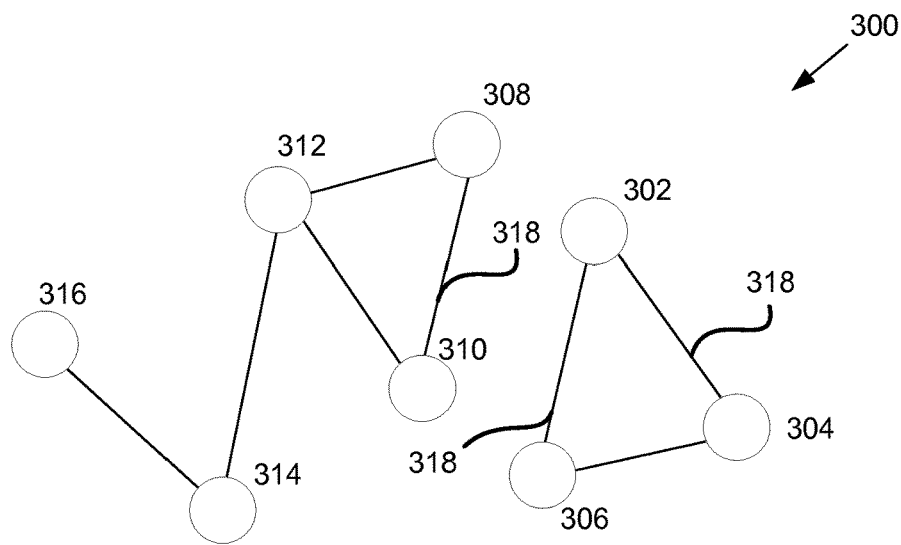
FIGS. 3A-3B illustrate an example of several computing entities that are grouped within a target scope of a target multi-computer infrastructure.

FIG. 3A shows a service relationship graph 300 with eight nodes for simplicity. It can be appreciated that, because the nodes represent computing entities in a multi-computer infrastructure, there may be many hundreds and/or thousands of nodes in a graph. Different nodes of the service relationship graph 300 may represent the computing entities 214, 216 shown in the multi-computer infrastructure 204 of FIG. 2. The service relationship graph 300 is based on the service relationship data 112.

Figure 3B:
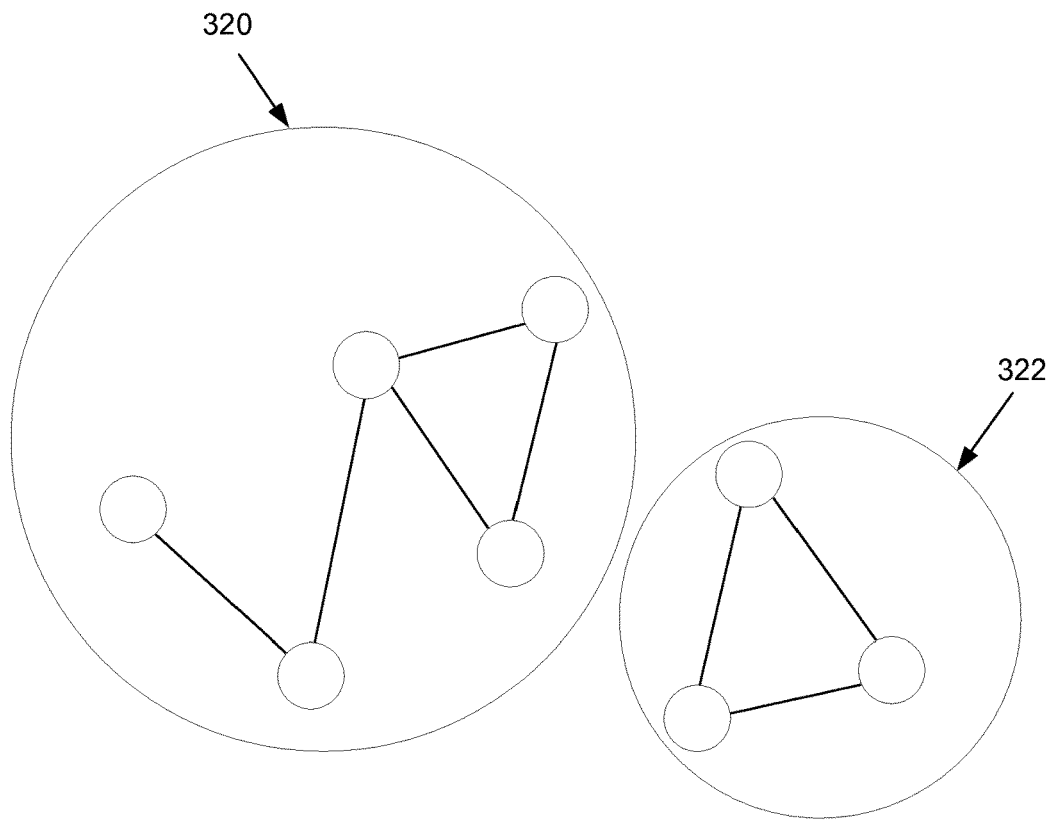

After the complete service relationship graph is received and/or generated at the computing device 104, the orchestration module 114 uses a graph analysis algorithm to isolate connected nodes into groups of nodes, as shown in FIG. 3B. Each group of connected nodes represents a group of computing entities that are linked only to each other and are not related to any other computing entities—see groups 302, 304. In other words, any computing entity in one group may be taken out of service without having any impact on capacity in the other groups. Thus, these computing entities in the two different groups 302, 304 can be removed from service in parallel without affecting capacity issues.

After the grouping shown in FIGS. 3A-B occurs, nodes (i.e., subgroups) within a group, which have no direct relationship, are identified. The orchestration module 114, in some configurations, uses a graph analysis algorithm to perform this identification of subgroups. An example of a graph analysis algorithm is the Welsh-Powell algorithm, modified for the techniques disclosed herein. A common value (e.g., color) is assigned to each node in a group graph such that no two connected nodes have the same value. A minimum node value variant seeks to use the least amount of values possible. A modified Welsh-Powell algorithm uses at most D+1 values, where D is the highest degree in the group graph. All nodes with the same value that have no relationship can be processed in parallel. Thus, those computing entities with the same value, regardless of which group they are in, are processed for service and/or maintenance at the same time (i.e., parallel servicing).

FIGS. 4A-C show graphically an example of a process for grouping nodes A-K in a graph, in which the nodes represent computing entities in a previously separated group of nodes. First, a valence (number of connections to other nodes) for each node is found. Table 1 below shows valence values for the nodes A-K.

TABLE 1

| Vertex | Valence |
|--------|---------|
| A | 2 |
| B | 2 |
| C | 1 |

TABLE 1-continued

| Vertex | Valence |
|---|---|
| D | 4 |
| E | 2 |
| F | 2 |
| G | 3 |
| H | 5 |
| I | 3 |
| J | 3 |
| K | 5 |

Next, the list of nodes in Table 1 is arranged in descending order of valence. The new order is:

H, K, D, G, I, J, A, B, E, F, C

In this example, when arranging in order, ties are broken by the use of other factors, such as an alphabetically or numerically ordered list. Other tie-breaking strategies may be used. Now, by applying the techniques to the example data, the nodes are colored in the order listed above. The following describes this coloring process for the first color (red shown as solid black):

H color red
K do not color red because it has a service relationship to H
D color red
G do not color red because it has a service relationship to H
I do not color red because it has a service relationship to H
J do not color red because it has a service relationship to H
A do not color red because it has a service relationship to H
B do not color red because it has a service relationship to D
E color red
F do not color red because it has a service relationship to E
C do not color red because it has a service relationship to D FIG. 4B illustrates this first coloring, where the solid nodes equate to red.

Next, the nodes that have been already colored are ignored resulting in a new list:

K, G, I, J, A, B, F, C

The coloring is now done for a second color (blue) on this new list:

K color blue
G do not color blue because it has a service relationship with K
I color blue
J do not color blue because it has a service relationship with I
A color blue
B do not color blue because it has a service relationship with A
F color blue
C color blue Again, in this example, the colored nodes are eliminated, leaving nodes G, J, B. Then, starting at the top of the new list with a new color (yellow) the following occurs:

G color yellow
J color yellow
B color yellow

The final graph is shown at FIG. 4C, where the solid represents red and the different patterns represent blue and yellow, respectively (blue=angled lines going down; yellow=angled lines going up).

Only three colors are used to describe this graph. In this case, three colors turn out to be the optimal solution because the graph contains at least one triangle (for example, there is the triangle HJI). It will always take at least three colors to color a graph with a triangle in it.

In an example implementation, computing entities may be removed from service and processed during off-business hours based on the identified subgroups. This means taking into consideration the "work window" for each region or time zone where the computing entities reside.

In an example implementation, two workflows manage the service orchestrations. The workflows run on a regular interval by two independent recurring payloads. A scheduler workflow runs once worldwide at a regular interval or at a dynamic interval. The scheduler workflow manages service orchestration states and schedules computing entities for servicing. The scheduler workflow uses state handlers to manage the state of each orchestration unit. A state handler for a particular orchestration unit manages the orchestration unit's state and calls the state handlers for subunits of the state handler. For example, an OrchestrationStateHandler routine is created for each live orchestration, which in turn spawns a new ScopeStateHandler routine for each scope in the orchestration. This breaks down entire service orchestration logic into smaller, manageable chunks, each with a single responsibility that is easier to test.

Orchestration State Handler
If orchestration state==NotStarted
   Create first scope entry
   Set orchestration state=InProgress
   Send email to notify start of orchestration
If current scope orchestration state==InProgress
   Create new scope state handler
   Call scope state handler on current scope
If current scope state==Failed
   Set orchestration state=Failed
If current scope state==Completed|Skipped
   Get next scope
If no next scope
   Set orchestration state=Completed
   Send out mail to notify orchestration success
Else
   Create the next scope entry and mark as AwaitingApproval
Scope State Handler
Set scope state=InProgress
If state of any groups in the scope==NotStarted|InProgress
   Create state handler for group
   Call group handler on each group
If all groups in the scope are done
If state of any group==Failed
   Set scope state=Failed
   Send email to notify about scope failure
Else
   Set scope state=Completed
   Send email to notify about scope success and to approve next scope
Group State Handler
If group state==NotStarted or state==AwaitingWorkWindow and work window has arrived
   Find all rack entries in current batch
   Set rack entry state=Scheduled and assign random execution location for rack Set group state=InProgress
Get all rack entries in group in current batch
If all computing entities are done
If any rack state==Failed
Set group state=Failed
Send email to notify about group failure
Else
Increment current batch
If no more batches left
Set group state=Completed
Else
Set next batch start time based on batch delay for orchestration type
Set group state=AwaitingWorkWindow The second recurring payload is a per-location-computing entity workflow. The per-location-computing entity workflow is repeated at a constant or dynamic interval (e.g., once every 15 minutes) in each location that has management machines. The per-location-computing entity workflow runs a computing entity workflow for all computing entities that have been scheduled by the scheduler workflow. The recurrent payload avoids parallel instances of a recurring payload. The next iteration is started when the previous one completes. This results in faster error reporting and retries. The per-location-computing entity workflow also operates according to local business hours for the current location of the computing entities and retry logic for each computing entity.

In one example, the management of orchestrations is done via remote scripts. The scripts manage the orchestration computing entities. The following are example scripts:

Start-RackOrchestration.ps1—Starts a new orchestration
Skip-RackOrchestrationEntry.ps1—Skips an entry
Restart-RackOrchestrationEntry.ps1—Restarts an entry
Stop-RackOrchestration.ps1—Cancels a live orchestration. This will not terminate any running computing entity workflows.
Approve-NextRackOrchestrationScope.ps1—Used to manually start the next scope in an orchestration Turning now to the flowchart of FIG. 5, aspects of a routine 500 for providing relationship analysis and orchestration scheduling are shown.

It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their entirety. Some or all operations of the methods, and/or substantially equivalent operations, can be performed by execution of computer-readable instructions included on a computer-storage media, as defined below. The term "computer-readable instructions," and variants thereof, as used in the description and claims, are used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special-purpose digital logic, and in any combination thereof.

As will be described in more detail below, in conjunction with FIG. 1, the operations of the routine 500 are described herein as being implemented, at least in part, by an application, component and/or circuit, such as the orchestration module 114. Although the following illustration refers to the components of FIG. 1, it can be appreciated that the operations of the routine 500 may be also implemented in many other ways. For example, the routine 500 may be implemented, at least in part, by the processors 118, 136 or a processor of another computer. In addition, one or more of the operations of the routine 500 may alternatively or additionally be implemented, at least in part, by a chipset working alone or in conjunction with other software modules. Any service, circuit, or application suitable for providing contextual data indicating the position or state of any device may be used in operations described herein.

Figure 5:
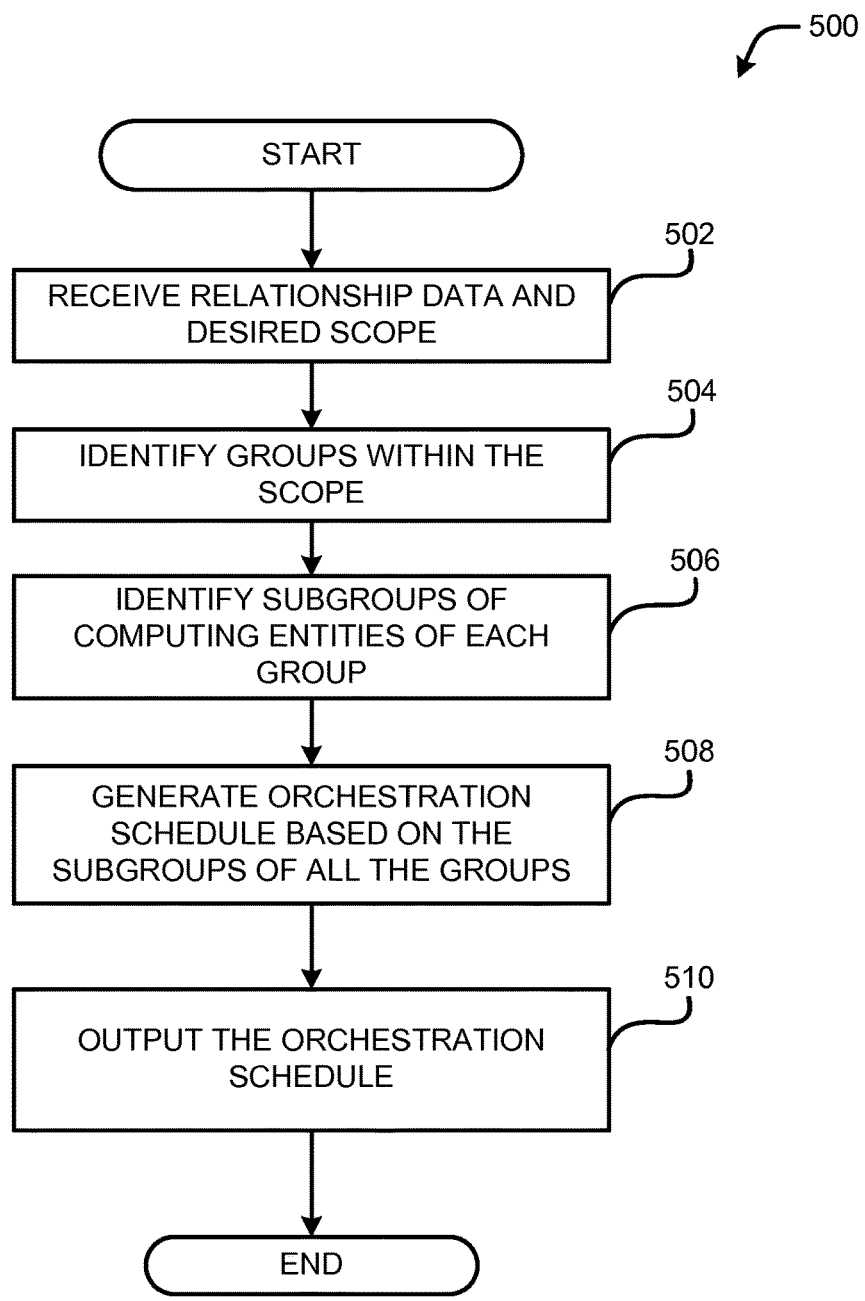
FIG. 5 is a flow diagram of one example routine that may be used for performing action orchestration for servicing computing entities of the target multi-computer infrastructure.

With reference to FIG. 5, aspects of the routine 500 for generating an orchestration schedule are shown. First, at operation 502, service relationship data and a desired scope for a network of interrelated computing entities are received. The service relationship data includes user-defined service relationships between computing entities, such as the computing entities 214, 216 of the multi-computer infrastructure 204 shown in FIG. 2. Other scope delineations or categorizations of computing entities may occur, depending upon the smallest unit size desired for allowing effective maintenance and/or service updating. The service relationship data and desired scope may be received at a provider's remote computer 102 associated with the multi-computer infrastructure 204 or at the computing device 104, depending upon what device is executing the orchestration module 114.

At operation 504, groups with the desired scope are identified. For a desired scope of the multi-computer infrastructure 204 groups of the interrelated computing entities are identified. All the computing entities of one group have a direct or indirect relationship with each other, but not with the computing entities of other groups. Graph analysis of the service relationship data is one technique for performing this grouping. Other techniques of analyzing the service relationship data may be performed.

At operation 506, computing entities of each group are separated into subgroups. The subgroups include computing entities, such as the computing entities 214, 216 that, when removed from service in the multi-computer infrastructure 204, do not affect service to the customers of multi-computer services provided by the multi-computer infrastructure 204. One technique for creating subgroups uses a graph analysis algorithm, such as a graph coloring algorithm. Other techniques for separating the computing entities of a group into subgroups may be performed provided that computing entities that provide the same service (e.g., email, storage, applications) to customers are not assigned to the same subgroup within a group.

At an operation 508, an orchestration schedule is generated, based on the grouped computing entities of all the groups. In some configurations, the orchestration module 114 performs this function. Orchestration scheduling takes all the computing entities of one subgroup from one group and computing entities of other subgroups from other groups and assigns them to the same schedule and/or service period. This is repeated for the computing entities of the other subgroups of all the groups until a complete schedule is created for effecting service and/or maintenance of all the computing entities within the scope of the multi-computer infrastructure 204.

For example, the computing entities having similar shading shown in FIG. 4C may be scheduled for maintenance at the same time. Taking any of the similarly shaded computing entities avoids customer service outages by ensuring that at least one computing entity that provides a service remains active/online.

At an operation 510, the orchestration schedule is outputted to the provider. The orchestration schedule or scheduling plan may be outputted to the provider in various formats. The orchestration schedule may be in any type of electronic format, for example, a calendar format, such as a Gantt chart.

Figure 6:
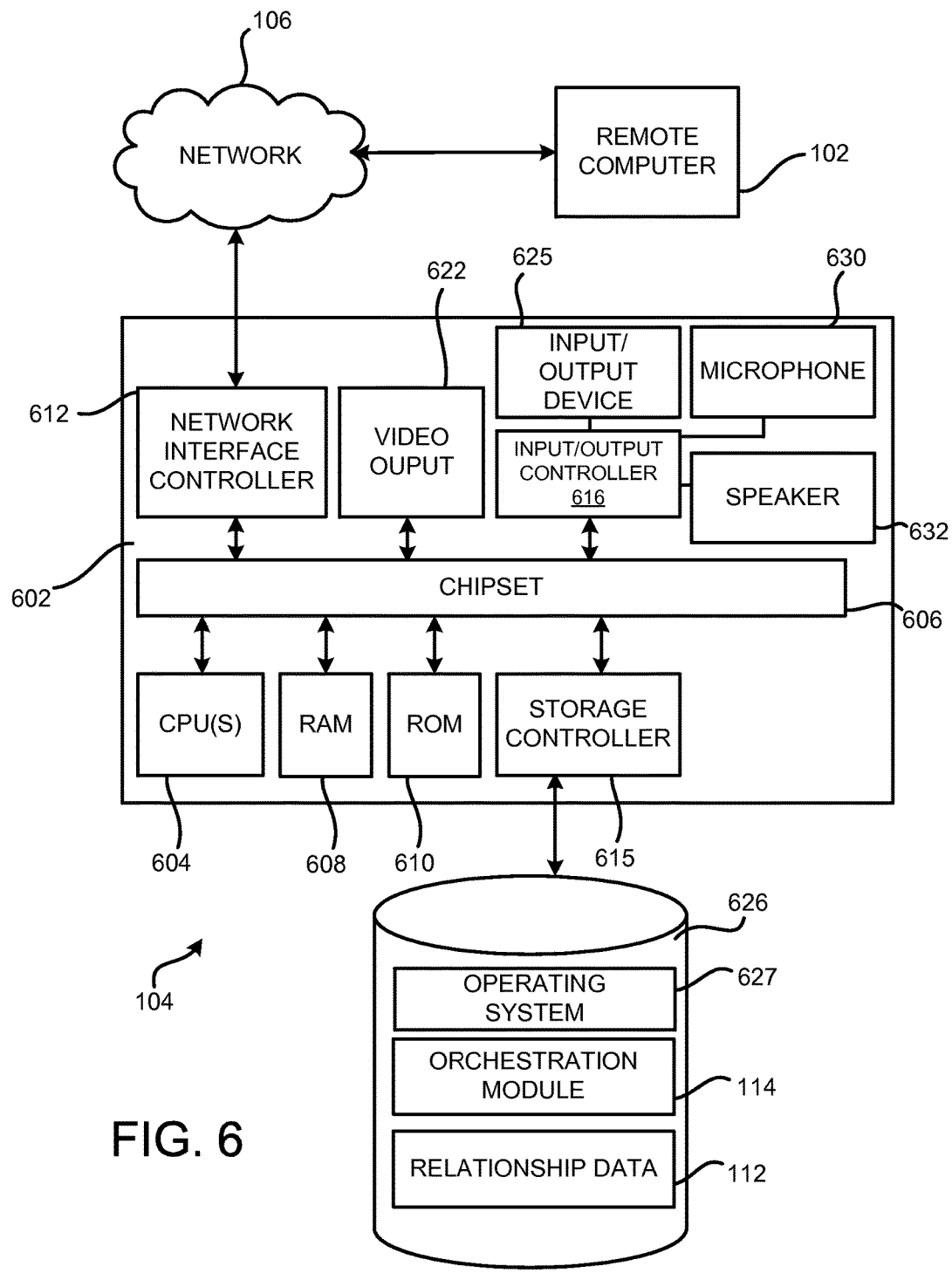
FIG. 6 is a computer architecture diagram showing an illustrative computer hardware and software architecture for a computing device capable of implementing aspects of the configurations presented herein.

FIG. 6 shows additional details of an example computer architecture, for the components shown in FIG. 1, capable of executing the program components described above for providing action orchestration for servicing computing entities within complex fault domains. The computer architecture shown in FIG. 6 illustrates a console, conventional server computer, workstation, desktop computer, laptop, tablet, phablet, network appliance, personal digital assistant (PDA), e-reader, digital cellular phone, or other computing device, and may be utilized to execute any of the software components presented herein. For example, the computer architecture shown in FIG. 6 may be utilized to execute any of the software components described above. Although some of the components described herein are specific to the computing device 104, it can be appreciated that such components, and other components, may be part of the remote computer 102.

The computing device 104 includes a baseboard 602, or "motherboard," which is a printed circuit board to which a multitude of components or devices may be connected by way of a system bus or other electrical communication paths. In one illustrative embodiment, one or more central processing units (CPUs) 604 operate in conjunction with a chipset 606. The CPUs 604 may be standard programmable processors that perform arithmetic and logical operations necessary for the operation of the computing device 104.

The CPUs 604 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state, based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 may provide an interface to a RAM 608, used as the main memory in the computing device 104. The chipset 606 may further provide an interface to a computer-readable storage medium, such as a read-only memory (ROM) 610 or nonvolatile RAM (NVRAM) for storing basic routines that help to start up the computing device 104 and to transfer information between the various components and devices. The ROM 610 or NVRAM may also store other software components necessary for the operation of the computing device 104 in accordance with the embodiments described herein.

The computing device 104 may operate in a networked environment using logical connections to remote computing devices and computer systems through a network, such as the local area network 106. The chipset 606 may include functionality for providing network connectivity through a network interface controller (NIC) 612, such as a gigabit Ethernet adapter. The NIC 612 is capable of connecting the computing device 104 to other computing devices over the network 106. It should be appreciated that multiple NICs 612 may be present in the computing device 104, connecting the computer to other types of networks and remote computer systems. The network 106 allows the computing device 104 to communicate with remote services and servers, such as the remote computer 102. In addition, as described above, the remote computer 102 may mirror and reflect data stored on the computing device 104 and host services that may provide data or processing for the techniques described herein.

The computing device 104 may be connected to a mass storage device 626 that provides nonvolatile storage for the computing device 104. The mass storage device 626 may store system programs, application programs, other program modules, and data, which have been described in greater detail herein. The mass storage device 626 may be connected to the computing device 104 through a storage controller 615, connected to the chipset 606. The mass storage device 626 may consist of one or more physical storage units. The storage controller 615 may interface with the physical storage units through a serial attached SCSI (SAS) interface, a serial advanced technology attachment (SATA) interface, a fiber channel (FC) interface, or other type of interface for physically connecting and transferring data between computers and physical storage units. It should also be appreciated that the mass storage device 626, other storage media, and the storage controller 615 may include MultiMediaCard (MMC) components, eMMC components, secure digital (SD) components, PCI Express components, or the like.

The computing device 104 may store data on the mass storage device 626 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 626 is characterized as primary or secondary storage, and the like.

For example, the computing device 104 may store information at the mass storage device 626 by issuing instructions through the storage controller 615 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 104 may further read information from the mass storage device 626 by detecting the physical states or characteristics of one or more particular locations within the physical storage units.

In addition to the mass storage device 626 described above, the computing device 104 may have access to other computer-readable media to store and retrieve information, such as program modules, data structures, or other data. Thus, although the orchestration module 114, the service relationship data 112, and other modules are depicted as data and software stored in the mass storage device 626, it should be appreciated that these components and/or other modules may be stored, at least in part, in other computer-readable storage media of the computing device 104. Although the description of computer-readable media contained herein refers to a mass storage device, such as a solid-state drive, a hard disk, or CD-ROM drive, it should be appreciated by those skilled in the art that computer-readable media can be any available computer storage media or communication media that can be accessed by the computing device 104.

Communication media include computer-readable instructions, data structures, program modules, or other data in a modulated data signal, such as a carrier wave or other transport mechanism and include any delivery media. The term "modulated data signal" means a signal that has one or more of its characteristics changed or set in a manner so as to encode information in the signal. By way of example, and not limitation, communication media include wired media, such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and nonvolatile, removable, and nonremovable media implemented in any method or technology for storage of information, such as computer-readable instructions, data structures, program modules, or other data. For example, computer media include, but are not limited to, RAM, ROM, EPROM, EEPROM, flash memory or other solid-state memory technology; CD-ROM, digital versatile disks (DVD), HD-DVD, BLU-RAY, or other optical storage; magnetic cassettes, magnetic tape, magnetic disk storage, or other magnetic storage devices; or any other medium that can be used to store the desired information and which can be accessed by the computing device 104. For purposes of the claims, the phrase "computer storage medium," and variations thereof, do not include waves or signals per se and/or communication media.

The mass storage device 626 may store an operating system 627 utilized to control the operation of the computing device 104. According to one embodiment, the operating system comprises the Windows® operating system from Microsoft Corporation. According to further embodiments, the operating system may comprise the UNIX, Android, Windows Phone or iOS operating systems, available from their respective manufacturers. It should be appreciated that other operating systems may also be utilized. The mass storage device 626 may store other system or application programs and data utilized by the computing device 104, such as the orchestration module 114, the service relationship data 112, and/or any of the other software components and data described above. The mass storage device 626 might also store other programs and data not specifically identified herein.

In one embodiment, the mass storage device 626 or other computer-readable storage media are encoded with computer-executable instructions, which, when loaded into the computing device 104, transform the computer from a general-purpose computing system into a special-purpose computer capable of implementing the embodiments described herein. These computer-executable instructions transform the computing device 104 by specifying how the CPUs 604 transition between states, as described above. According to one embodiment, the computing device 104 has access to computer-readable storage media storing computer-executable instructions, which, when executed by the computing device 104, perform the various routines described above with regard to FIG. 5 and the other figures. The computing device 104 might also include computer-readable storage media for performing any of the other computer-implemented operations described herein.

The computing device 104 may also include one or more input/output controllers 616 for receiving and processing input from a number of input devices, such as a keyboard, a mouse, a microphone, a headset, a touchpad, a touch screen, an electronic stylus, or any other type of input device. Also shown, the input/output controllers 616 are in communication with an input/output device 625. The input/output controller 616 may provide output to a display, such as a computer monitor, a flat-panel display, a digital projector, a printer, a plotter, or other type of output device. The input/output controller 616 may provide input communication with other devices such as a microphone 630, a speaker 632, game controllers, and/or audio devices. In addition, or alternatively, a video output 622 may be in communication with the chipset 606 and operate independent of the input/output controllers 616. It will be appreciated that the computing device 104 may not include all of the components shown in FIG. 6, may include other components that are not explicitly shown in FIG. 6, or may utilize an architecture completely different from that shown in FIG. 6.

EXAMPLE CLAUSES

A: A computer-implemented method, comprising: obtaining data, at a computing device, that defines service relationships between computing entities in a network of computing entities associated with a service provider; determining two or more groups of computing entities based, at least in part, on the obtained data, wherein individual computing entities of individual ones of the two or more groups have one of a direct or indirect relationship with other computing entities within the same group; determining one or more subgroups of an individual one of the two or more groups based, at least in part, on the obtained data, wherein individual computing entities within a first subgroup of the one or more subgroups do not have a direct relationship with any of the other computing entities within the first subgroup; and generating output data identifying at least a portion of the one or more subgroups.

B: The method of A, wherein the determining the one or more subgroups of a first group includes: generating a graphical representation of the first group; performing graph analysis of the graphical representation of the first group; and identifying the subgroups of the first group based on the graph analysis.

C: The method of A or B, wherein the performing the graph analysis comprises executing a graph coloring algorithm.

D: The method of A, B or C, wherein the generating the output data comprises generating a maintenance plan based on the determined one or more subgroups.

E: The method of D, wherein the maintenance plan comprises maintenance time information based at least on location information associated with individual ones of the computing entities.

F: The method of A, B, C, D or E, wherein the service provider comprises a multi-computer service provider and the network of computing entities comprises a plurality of computing entities of a multi-computer infrastructure.

G: The method of F, wherein the obtained data identifies at least one relationship between at least two of the plurality of computing entities, the at least one relationship relate to at least one service provided to at least one customer of the multi-computer service provider.

H: A computing device, comprising: a processor; and a memory having computer-executable instructions stored thereupon which, when executed by the processor, cause the computing device to: obtain data that defines service relationships between computing entities in a network of computing entities controlled by a service provider; determine two or more groups of computing entities based at least on the obtained data, wherein individual computing entities in a first group of the two or more groups has one of a direct or indirect relationship with other computing entities in the first group; determine one or more subgroups of an individual one of the two or more groups based at least on the obtained data, wherein individual computing entities within a first subgroup of the one or more subgroups do not have a direct relationship with any of the computing entities within the first subgroup; and generate output data identifying at least a portion of one or more of the subgroups.

I: The computing device of H, wherein the determining the two or more subgroups includes: generating a graphical representation of the first group; performing graph analysis of the graphical representation of the first group; and identifying the subgroups of the first group based on the graph analysis.

J: The computing device of I, wherein the performing the graph analysis comprises executing a graph coloring algorithm.

K: The computing device of H, I or J, wherein the generating the output data comprises generating a maintenance plan based on the determined one or more subgroups.

L: The computing device of K, wherein the maintenance plan comprises maintenance time information based at least on location information associated with individual ones of the computing entities.

M: The computing device of H, I, J, K or L, wherein the service provider comprises a multi-computer service provider and the network of computing entities comprises a plurality of computing entities of a multi-computer infrastructure.

N: The computing device of M, wherein the obtained data identifies at least one relationship between at least two of the plurality of computing entities, the at least one relationship relate to at least one service provided to at least one customer of the multi-computer service provider.

O: A computer storage medium having computer-executable instructions stored thereupon which, when executed by a computing device, cause the computing device to: obtain data that defines service relationships between computing entities in a network of computing entities associated with a service provider; determine two or more groups of computing entities based at least on the obtained data, wherein individual computing entities in a first group of the two or more groups has one of a direct or indirect relationship with other computing entities in the first group; determine one or more subgroups of an individual one of the two or more groups based at least on the obtained data, wherein individual computing entities within a first subgroup of the one or more subgroups do not have a direct relationship with any of the computing entities within the first subgroup; and generate output data identifying at least a portion of one or more of the subgroups.

P: The computer storage medium of O, wherein the determining the two or more subgroups includes: generating a graphical representation of the first group; performing graph analysis of the graphical representation of the first group; and identifying the subgroups of the first group based on the graph analysis Q: The computer storage medium of P, wherein the generating the output data comprises generating a maintenance plan based on the determined one or more subgroups.

R: The computer storage medium of Q, wherein the maintenance plan comprises maintenance time information based at least on location information associated with individual ones of the computing entities.

S: The computer storage medium of O, P, Q or R, wherein the service provider comprises a multi-computer service provider and the network of computing entities comprises a plurality of computing entities of a multi-computer infrastructure.

T. The computer storage medium of S, wherein the obtained data identifies at least one relationship between at least two of the plurality of computing entities, the at least one relationship relate to at least one service provided to at least one customer of the multi-computer service provider.

Based on the foregoing, it should be appreciated that technologies for providing action orchestration of computing entities in a complex network are provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for optimizing a number of computing entities that can be selected for maintenance, comprising:
   obtaining data, at a computing device, that defines service relationships between the computing entities in a network of computing entities associated with a service provider, wherein the computing entities perform computing operations of a service;
   determining two or more groups of computing entities based, at least in part, on the obtained data, wherein individual computing entities of the two or more groups have a direct relationship or an indirect relationship with other computing entities within the same group;
   determining one or more subgroups of at least one group of the two or more groups based, at least in part, on the obtained data, wherein individual computing entities within a first subgroup of the one or more subgroups have an indirect relationship with any of the other computing entities within the first subgroup, and wherein individual computing entities within a second subgroup of the one or more subgroups have an indirect relationship with any of the other computing entities within the second subgroup;

generating output data identifying at least a portion of the one or more subgroups; and causing the individual computing entities within the first subgroup to be removed from the service for maintenance, wherein the removal of the individual computing entities within the first subgroup minimizes the impact of the computing operations of the service.

2. The method of claim 1, wherein determining the one or more subgroups includes:

generating a graphical representation of a first group of the two or more groups based, at least in part, on a portion of the obtained data;

performing graph analysis of the graphical representation of the first group; and identifying the subgroups of the first group based on the graph analysis.

3. The method of claim 2, wherein performing the graph analysis comprises executing a graph coloring algorithm.

4. The method of claim 1, wherein generating the output data comprises generating a maintenance plan based on the determined one or more subgroups.

5. The method of claim 4, wherein the maintenance plan comprises maintenance time information based at least on location information associated with individual computing entities.

6. The method of claim 1, wherein the service provider comprises a multi-computer service provider and the network of computing entities comprises a multi-computer infrastructure.

7. The method of claim 6, wherein the obtained data identifies at least one relationship between at least two of the computing entities, the at least one relationship relates to at least one service provided to at least one customer of the multi-computer service provider.

8. A computing device for optimizing a number of computing entities that can be selected for maintenance, comprising:

a processor; and a memory having computer-executable instructions stored thereupon which, when executed by the processor, cause the computing device to:

obtain data that defines service relationships between the computing entities in a network of computing entities controlled by a service provider, wherein the computing entities perform computing operations of a service;

determine two or more groups of computing entities based, at least in part, on the obtained data, wherein individual computing entities in a first group of the two or more groups has a direct relationship or an indirect relationship with other computing entities in the first group;

determine one or more subgroups of at least one group of the two or more groups based, at least in part, on a portion of the obtained data, wherein individual computing entities within a first subgroup of the one or more subgroups have an indirect relationship with any of the other computing entities within the first subgroup, and wherein individual computing entities within a second subgroup of the one or more subgroups have an indirect relationship with any of the other computing entities within the second subgroup;

generate output data identifying at least a portion of one or more of the subgroups; and cause the individual computing entities within the first subgroup to be removed from the service for maintenance, wherein the removal of the individual computing entities within the first subgroup minimizes the impact of the computing operations of the service.

9. The computing device of claim 8, wherein determining the two or more subgroups includes:

generating a graphical representation of the first group based, at least in part, on a portion of the obtained data;

performing graph analysis of the graphical representation of the first group; and identifying the subgroups of the first group based on the graph analysis.

10. The computing device of claim 9, wherein performing the graph analysis comprises executing a graph coloring algorithm.

11. The computing device of claim 8, wherein generating the output data comprises generating a maintenance plan based on the determined one or more subgroups.

12. The computing device of claim 11, wherein the maintenance plan comprises maintenance time information based at least on location information associated with individual computing entities.

13. The computing device of claim 8, wherein the service provider comprises a multi-computer service provider and the network of computing entities comprises a multi-computer infrastructure.

14. The computing device of claim 13, wherein the obtained data identifies at least one relationship between at least two of the plurality of computing entities, the at least one relationship relates to at least one service provided to at least one customer of the multi-computer service provider.

15. A non-transitory computer storage medium having computer-executable instructions stored thereupon which, when executed by a computing device, cause the computing device to:

obtain data that defines service relationships between computing entities in a network of computing entities associated with a service provider, wherein the computing entities perform computing operations of a service;

determine two or more groups of computing entities based, at least in part, on the obtained data, wherein individual computing entities in a first group of the two or more groups has a direct relationship or an indirect relationship with other computing entities in the first group;

determine one or more subgroups of at least one group of the two or more groups based, at least in part, on the obtained data, wherein individual computing entities within a first subgroup of the one or more subgroups do not have a direct relationship with any of the other computing entities within the first subgroup, and wherein individual computing entities within a second subgroup of the one or more subgroups do not have a direct relationship with any of the other computing entities within the second subgroup;

generate output data identifying at least a portion of one or more of the subgroups; and cause the individual computing entities within the first subgroup to be removed from the service for maintenance, wherein the removal of the individual computing entities within the first subgroup minimizes the impact of the computing operations of the service.

16. The non-transitory computer storage medium of claim 15, wherein determining the two or more subgroups includes:
   generating a graphical representation of the first group based, at least in part, on a portion of the obtained data;
   performing graph analysis of the graphical representation of the first group; and
   identifying the subgroups of the first group based on the graph analysis.

17. The non-transitory computer storage medium of claim 16, wherein generating the output data comprises generating a maintenance plan based on the determined one or more subgroups.

18. The non-transitory computer storage medium of claim 17, wherein the maintenance plan comprises maintenance time information based at least on location information associated with individual computing entities.

19. The non-transitory computer storage medium of claim 15, wherein the service provider comprises a multi-computer service provider and the network of computing entities comprises a multi-computer infrastructure.

20. The non-transitory computer storage medium of claim 19, wherein the obtained data identifies at least one relationship between at least two of the plurality of computing entities, the at least one relationship relates to at least one service provided to at least one customer of the multi-computer service provider.

\* \* \* \* \*